Aug. 3, 1954

M. KRAMCSAK, JR 2,685,351

BRAKE-EQUIPPED CASTER

Filed June 4, 1952

Inventor
Michael Kramcsak, Jr.
By Rockwell & Buth Row
Attorneys

Aug. 3, 1954
M. KRAMCSAK, JR
2,685,351
BRAKE-EQUIPPED CASTER
Filed June 4, 1952
3 Sheets-Sheet 2
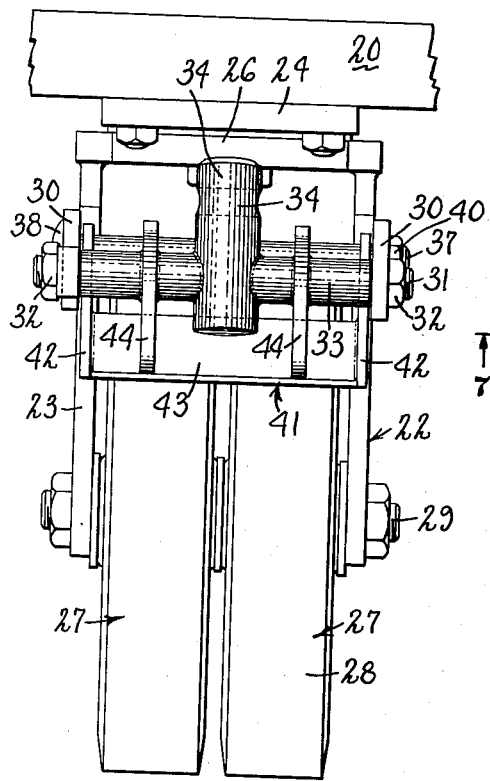
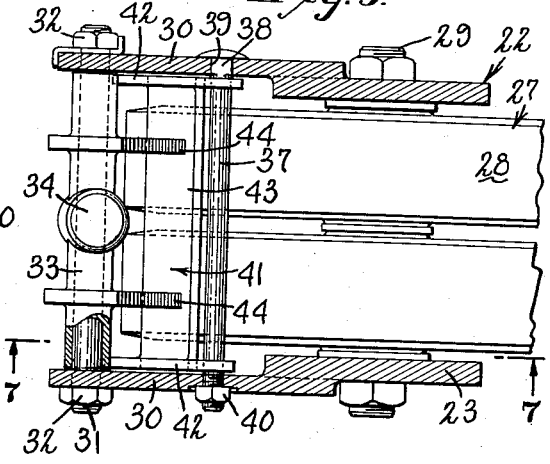
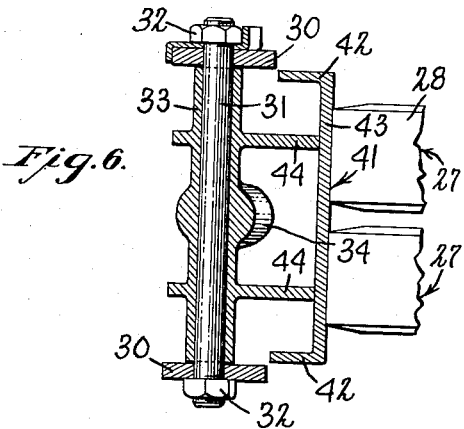
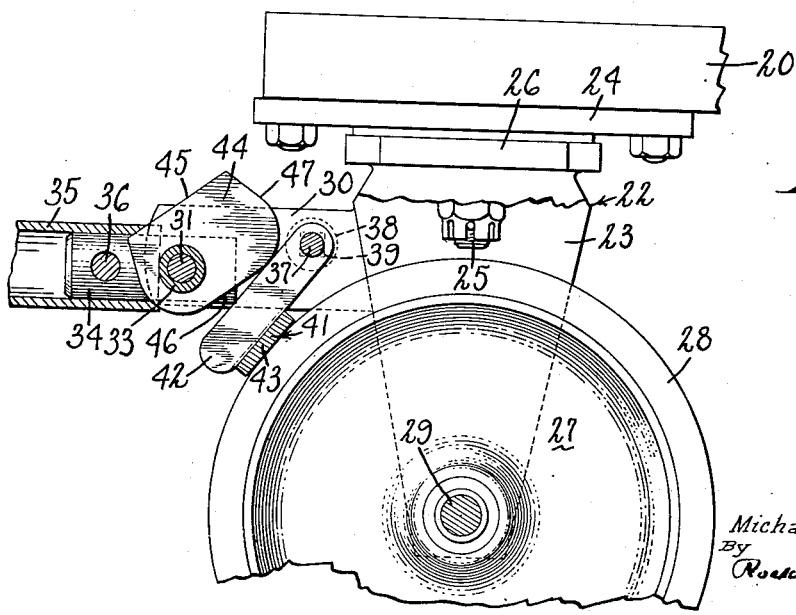
Inventor
Michael Kramcsak, Jr.
By
Rockwell & Bartholow
Attorneys Aug. 3, 1954
M. KRAMCSAK, JR
2,685,351
BRAKE-EQUIPPED CASTER
Filed June 4, 1952
3 Sheets-Sheet 3
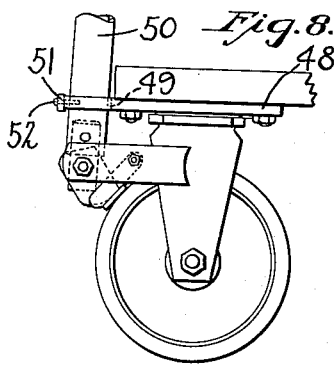
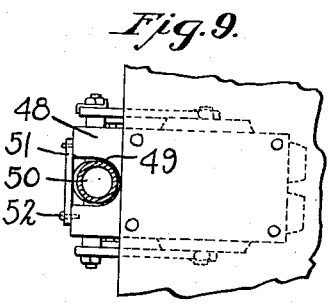
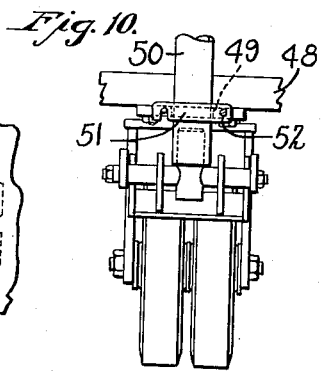
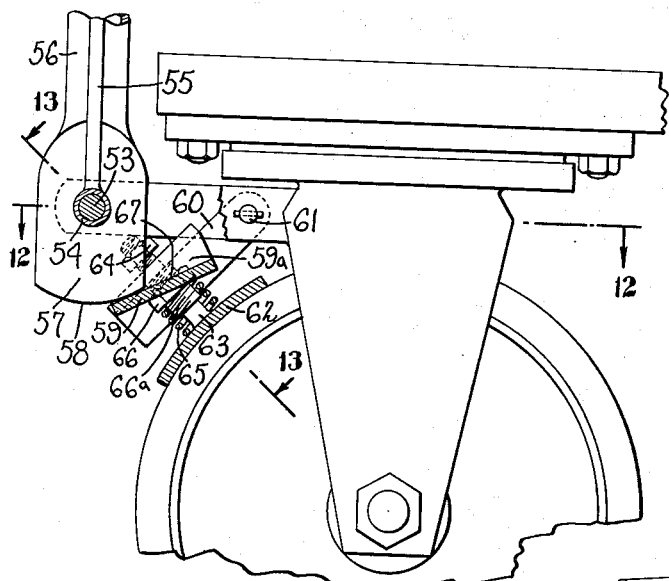
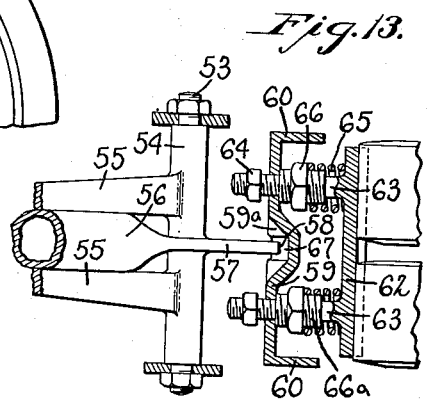
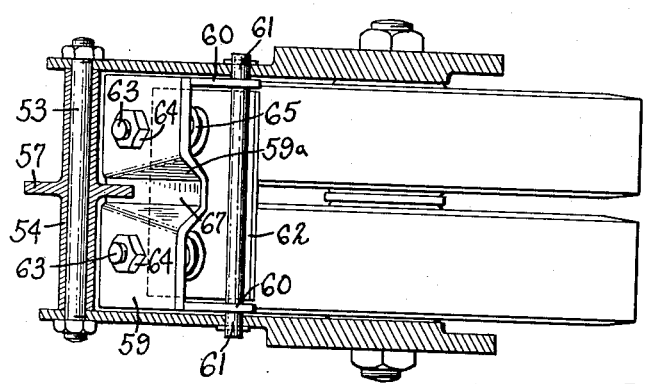
Inventor
Michael Kramcsak, Jr.
By Rockwell & Buthaler
Attorneys Patented Aug. 3, 1954

2,685,351

UNITED STATES PATENT OFFICE 2,685,351

BRAKE-EQUIPPED CASTER

Michael Kramcsak, Jr., Bridgeport, Conn., assignor to The Bassick Company, Bridgeport, Conn., a corporation of Connecticut Application June 4, 1952, Serial No. 291,701

8 Claims. (Cl. 188—119)

This invention relates to brake-equipped casters, and while not limited thereto in all aspects, it is particularly concerned with provisions for braking a truck caster that has a forward location with respect to the truck or other vehicle.

The invention also deals particularly with provisions for braking a caster which has operative connection with a tow bar at the front end of the vehicle, the tow bar being mounted so that it has an approximately horizontal position for purposes of towing and a substantially upright position which may be assumed by the tow bar when it is not in use.

One of the objects of the invention is to provide substantial improvement in construction and operation of devices of the general class above mentioned.

Another object is to provide in association with a caster located adjacent the forward end of the truck a towing arrangement involving a tow bar upwardly swingable from a towing position to an inoperative position, and in conjunction with the tow bar and the caster a braking means for the caster wheel which is in an inoperative position when the vehicle is being towed and is moved to braking position when the tow bar is moved upwardly into an inoperative position.

Another object is to provide improvements in the construction and operation of brake-equipped casters, such improvements being particularly well adapted for use with caster wheels of relatively large size.

In the accompanying drawings:

Fig. 4 is an elevation of the structure shown in Fig. 3 looking toward the front end of the truck;

Fig. 5 is a section on line 5—5 of Fig. 3;

Fig. 6 is a section on line 6—6 of Fig. 3;

Fig. 7 is a view similar to Fig. 3 but showing certain parts in vertical section on line 7—7 of Fig. 5, the brake in this instance being in the inoperative position;

Fig. 8 is an elevational view similar to Fig. 3 illustrating a modified form;

Fig. 9 is a plan view of the structure shown in Fig. 8;

Fig. 10 shows the same structure illustrated in Fig. 9, looking toward the front end of the truck;

Fig. 11 is a side elevation, partly in vertical longitudinal section, illustrating a further modification;

Fig. 12 is a section on line 12—12 of Fig. 11; and

Fig. 13 is a section on line 13—13 of Fig. 11.

Figure 1:
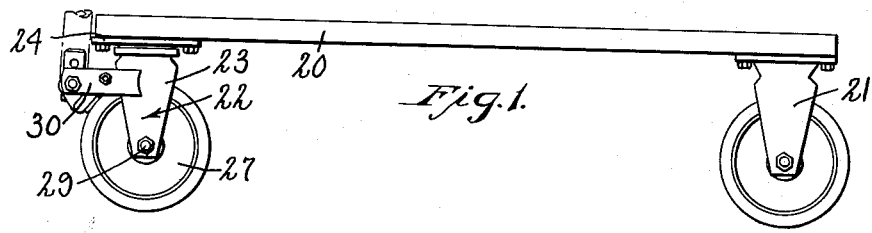
Fig. 1 is a side elevation of a truck having a forwardly located caster embodying the present invention, the caster wheel being in the braked position, a portion of the tow bar being indicated by dotted lines.
Figure 2:
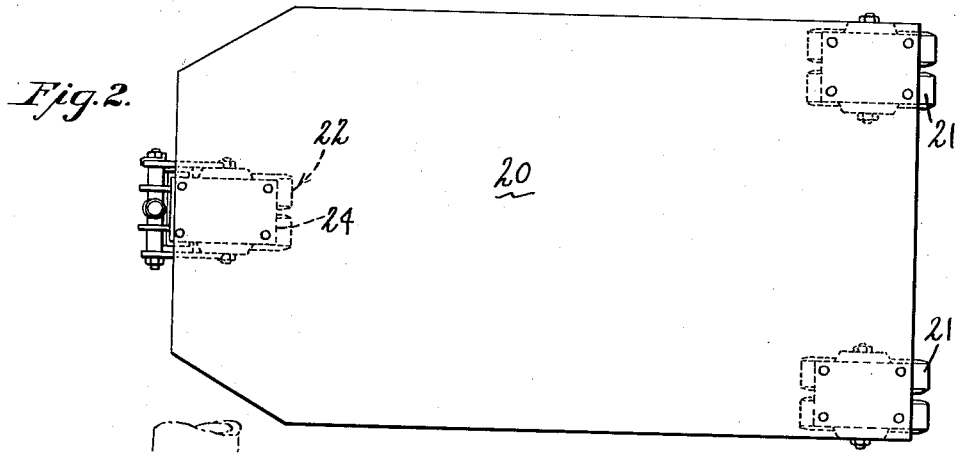
Fig. 2 is a top plan view of the truck.

In all of the forms illustrated the brake-equipped caster is shown in association with an industrial truck or like vehicle having a caster of the duplex type located at the forward end thereof. In speaking of a "duplex type" of caster, I have reference to the provision of two caster wheels located side by side on the same axle. In the form shown, there is only one caster employed at the forward end of the vehicle, this being a swiveling caster the horn of which is connected to a tow bar by means of which the vehicle can be pulled and steered. The tow bar is mounted for swinging movement in an upright plane so that it can be moved from the substantially horizontal towing position to an upwardly disposed inoperative position. Associated with the caster and tow bar is a braking means for the caster wheels, which braking means is in a released position when the vehicle is being towed but is moved to braking position when the tow bar is swung upwardly to a predetermined extent as hereinafter explained.

In the form shown in Figs. 1 to 7, inclusive, the truck body is indicated at 20, the two rear casters, which are preferably of the non-swivelling type, at 21, and the one forward caster, which is of the swivelling type and has two wheels, at 22. The horn of the caster 22 is indicated at 23, the top plate at 24, the swivelling pin at 25, and the anti-friction bearing structure between the top of the horn and the top plate at 26. This anti-friction bearing structure preferably includes, as usual, a number of anti-friction balls not shown in the drawings. The wheels of the duplex caster 22 are indicated at 27, the same preferably being metal wheels equipped with cushioning tread portions or tires 28, and these wheels are mounted side by side on a common axle 29 which is supported in the usual manner in the lower end portions of the horn.

Projecting forwardly from the respective legs of the horn 23 are frame members 30 in the nature of straps or bars which are rigid with the forward portion of the horn at an elevation somewhat below the top of the horn. These members 30 are secured to the horn in a suitable manner as by welding, the connections with the horn being indicated by dotted lines in Fig. 5, the members 30 preferably being applied to the outer faces of the horn legs as shown in that view. Adjacent their forward ends the frame members 30 are perforated to receive the end portions of a crossbolt 31 secured in the frame by means such as nuts 32 threaded on the bolt ends. Mounted swingingly on the bolt 31 and between the frame members 30 is a sleeve member 33 providing a hollow rockable shaft adapted to turn on the horizontal axis provided by the bolt 31. This hollow shaft has secured to the intermediate part thereof a stud or trunnion member 34. The member 34 may be secured to member 33 in a suitable manner as by welding, or if desired it may be made integral with the member 33. A part of the trunnion member 34 provides a generally cylindrical stud adapted to be secured to the end of a suitable towing member 35. The towing member 35 may conveniently be formed as a metal tube, the end of which may be fitted over the stud 34 and fixed thereto in a suitable manner as by having a fastening pin 36 extend through the tubular bar and through the stud, as shown in Fig. 7. In the towing position, the tow bar extends forwardly in a substantially horizontal position, as shown in Fig. 7, but when the vehicle is at rest the tow bar can be swung on the axis of the bolt 31 to an upwardly directed position, as indicated by the dotted lines in Fig. 3.

Extending across the frame provided by the members 30, in a region rearwardly of the bolt 31, is a transverse supporting member which, in this instance, is provided by a carriage bolt 37 having at one end a headed portion 38 that is non-rotatively held in a polygonal hole 39 in one of the members 30. At the opposite end, the bolt 37 has a nut 40 threaded thereon, which nut serves to secure bolt 37 firmly in the supporting frame.

The bolt 37 serves as a pivotal axis for a brake shoe member 41 that extends forwardly and downwardly with respect to bolt 37 and is adapted to be pressed against the tread portions 29 of the caster wheels to arrest their rotation. In the preferred form the brake shoe 41 includes end members 42 in the nature of metal straps having perforated upper ends loosely engaging the bolt 37, and the shoe also comprises a braking plate 43 rigidly fastened to the end members 42 in a suitable manner, as by placing welds between the upper face of the member 43 and adjacent lower edge portions of the members 42, as shown in Fig. 7. By this construction there is provided a brake shoe structure swingable in a vertical plane and having near the lower end of the swinging member a braking element that under certain conditions can ride loosely against the tread surfaces of the wheels, while under other conditions, as hereinafter described, the shoe can be forced into tight braking engagement with the wheel treads.

For the purpose of causing the braking action just referred to, the hollow rockable shaft 33 is provided with suitable means operable on turning of the shaft to cam the brake shoe to the braking position by engaging the upper surface of the sloping brake plate 43. In the present form there are provided in fixed relationship to the hollow rock shaft two cams 44, each cam being opposite one of the caster wheels. The cams 44 can be secured to the rock shaft in a suitable manner, as by welding them thereto. Each cam 44 is formed as a plate having a straight upper edge 45 (Fig. 7) and a lower edge 46 which is straight at the middle and rounded at the ends, the rounded ends leading to sloping sides 47 that converge in the direction of the edge 45. The sloping sides 47 of these cam plates are adapted to engage the brake plate in the manner shown in Fig. 3 for the purpose of holding the brake plate tightly against the wheel. The general longitudinal axis of each cam 44 is at an acute angle to the axis of the tow bar, as will be seen from Fig. 3, and the braking condition just referred to obtains when the tow bar is in the upwardly directed position of Fig. 3. In this upwardly disposed inoperative position of the tow bar (Fig. 3) it will be observed that the tow bar has not only been swung upwardly but has been moved slightly rearwardly of the dead-center position, in which position the tow bar will be securely held by reason of the fact that the caster is securely braked, thus preventing any rolling movement of the vehicle.

When it is desired to tow the vehicle, the brake can be readily released by swinging the tow bar forwardly and downwardly. When this movement occurs the lower end portion of each cam 44 is forced upwardly so as to slide the sloping edge of the cam over the brake plate, and the cam, when the tow bar reaches the towing position (Fig. 7) takes a position in which it is spaced upwardly from the brake plate to a substantial extent. Under these conditions the brake plate will ride loosely against the wheel tread in a region where the wheel tread is downwardly curved, and there will be no interference with the rolling movement of the vehicle.

It is also to be noted that in the structure now being described the top plate 24 of the caster is secured to the under surface of the vehicle body in a manner such that the forward edge of the top plate is somewhat forward of the forward edge of the body. In this particular case the forward edge of the top plate is straight and the tow bar, when in the inoperative or safety position of Fig. 3, will extend in close proximity to the top plate, the result being that, by reason of the closeness of the tow bar to the top plate, any substantial swiveling action of the caster will be prevented. It is understood, therefore, that in this position the caster is not only braked against rolling movement but is effectively locked against swiveling.

Figure 3:
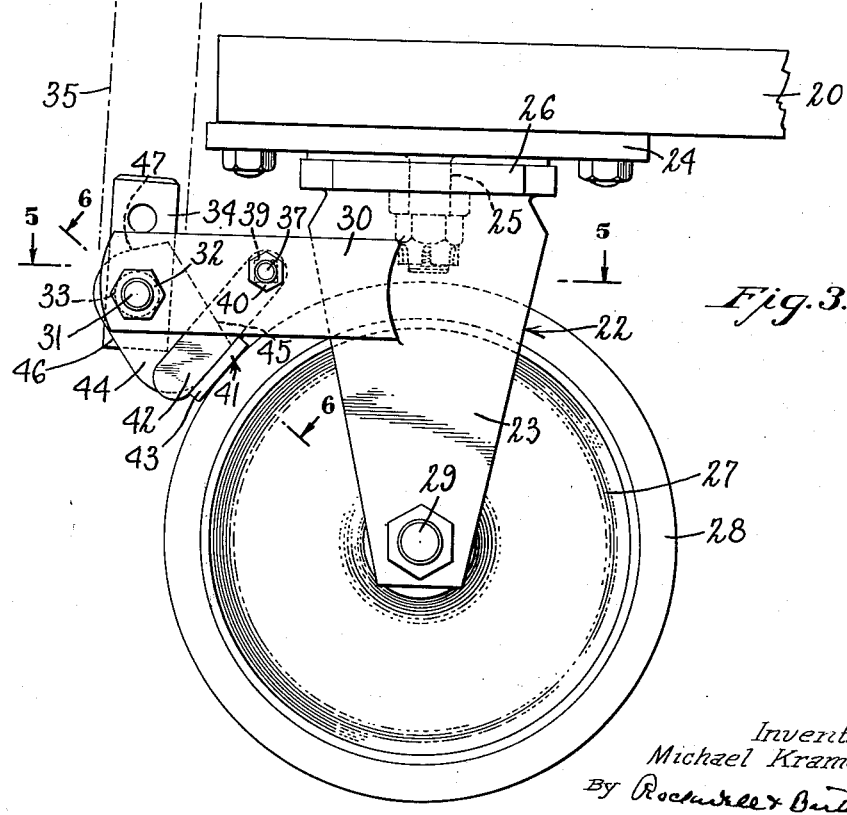
Fig. 3 is an enlarged view of certain parts shown in Fig. 1.

In the device now being described, the cam, which applies braking pressure to the brake plate, has a sloping surface at the edge, which in the braking position engages the upper face of the brake plate over a considerable area in the width of the plate, as shown in Fig. 3 of the drawings, whereby the brake plate and the cam are firmly held in frictional engagement with each other, and in this position of the parts the tow bar is in a position in which it is tilted rearwardly to a slight extent.

The modified form shown in Figs. 8, 9 and 10 is similar to that first described, but in this case the top plate of the caster, indicated at 48, is provided with a notch 49 at its forward edge, in which notch the tow bar 50 (similar to tow bar 35) is received when the tow bar is in the inoperative position. Suitable means may be provided, if desired, to retain the tow bar in this notch, and in the form shown such means comprises an upwardly and downwardly swingable pivoted clip 51 that can be readily swung out of the way when the tow bar is to be moved downwardly to towing position. The pivot of the retaining clip is indicated at 52.

In the form shown in Figs. 11, 12 and 13 there is only one cam provided for applying the brake to a duplex caster. Here the bolt extending across the front end portion of the supporting frame is indicated at 53, and a hollow rock shaft 54 surrounds this bolt and has integrally connected with the shaft upright arms 55 which are fastened as by welding to a tubular tow bar 56. The lower end of the tow bar is flattened to form a single cam 57 located intermediate of the ends of the rock shaft and extended around the rock shaft. The cam 57 has a gently curved camming edge 58 that is adapted to co-act with the depressed central portion 59ª of a pressure plate 59 that may be secured as by welding to arms 60 pivoted at their upper ends to the supporting frame, as indicated at 61. The pressure plate 59 and the pivoted arms 60 provide a pressure member adapted to apply pressure to a brake shoe 62 which extends across and makes contact with the tread surfaces of the caster wheels. The brake shoe 62 is provided with upwardly extended integral shanks or stems 63 that are threaded at their outer ends and extend through openings in the pressure plate 59. These shanks or stems 63 have nuts 64 applied to their upper extremities, and between the pressure plate 59 and the brake shoe 62 are interposed coil springs 65. The compression of the springs 65 can be regulated by adjustment of nuts 66 mounted on threaded sleeves 66ª, and by such adjustment the amount of pressure brought against the wheel can be regulated. When the tow bar is in the horizontal position, its cam 57 is spaced upwardly above the brake shoe mechanism, but, when the tow bar is moved to the substantially vertical position shown in Fig. 11, the lower edge of the cam is engaged with the pressure plate in a manner to apply the brake shoe to the wheel. The braking force can be regulated by adjusting the compression of the springs 65.

In the operative position of the brake the lower edge of the cam 57 is engaged with a groove 67 in the depressed portion 59ª of the pressure plate. The surface which provides the bottom of the groove 67 has a slanting relationship with respect to the pressure plate, the groove having considerable depth at the upper side of the pressure plate (Fig. 11) and progressively decreasing in depth to the lower side.

It will be seen that by the invention there is provided a combined caster and tow-bar structure equipped with a braking device for the caster wheel or wheels that is released when the tow bar is in towing position and is applied automatically when the tow bar is swung upwardly to an inoperative or safety position. This simplifies the handling of the truck to a considerable degree inasmuch as the brake can be applied and released by manipulation of the tow bar. The tow bar provides an effective means through which application and release of the brake can be effected, and the tow bar, with its pivotal mounting and extended leverage, enables ample force to be brought to bear for applying the brake very strongly and effecting release of the strongly applied brake. Moreover, the mechanism whereby the swinging movement of the tow bar is converted into a braking effect is an important feature of the invention, as it is a very simple structure and operates very satisfactorily in braking and releasing the wheel. While in all of the examples shown the caster is of the duplex type, it is to be understood that in its broader aspects the invention is not limited to casters having more than one wheel.

The cam device fixed to the tow bar and located below or rearwardly of the tow bar pivot can, of course, have considerable leverage exerted thereon. Such a cam operates very satisfactorily in a structure of the kind herein described, where the braking element is located forwardly of the caster horn and rearwardly of the tow bar pivot and is of the swinging type having an upper pivot in the supporting frame and carrying a brake shoe which engages the wheel at the forward upper part of the wheel.

It will be noted that in all of the examples shown in the drawings the caster is of the non-offset type, that is to say, one in which the swiveling axis of the horn and the turning axis of the wheel are in the same vertical plane. This is the preferred arrangement for an assembly involving a tow bar that is operably connected to a braking element for the wheel, but in some cases the caster structure may be of another type.

It may also be noted that the casters illustrated in the drawings are relatively large casters in which the wheel diameter is approximately twelve inches. With such a caster the brake-operating bar or lever acting as a tow bar should have substantial length, as the tow bar usually has a length at least several times as great as the wheel diameter. The length is variable, of course, in order to meet the different conditions met in the use of the vehicle.

While some embodiments of the invention are illustrated in the drawings, various other embodiments can be used, and many detail changes made without departure from the principles of the invention or the scope of the claims.

What I claim is:

1. In a caster such as described, the combination of a horn having a caster wheel mounted therein, a support projecting forwardly from the upper part of the horn having substantially parallel side members, a cross member interconnecting said members adjacent the forward ends thereof, an elongated swingable brake member pivotally mounted in said support between said cross member and the horn transversely of the caster wheel and adapted to bear against and brake the caster wheel, and a tow bar pivotally mounted relatively to said support by said cross member and swingable from a substantially horizontal position to a substantially upright position, said tow bar carrying a member which operatively engages said brake member to brake the caster when the tow bar is in the upright position and releases said brake member as the tow bar is lowered, said engaging member being a cam rigid with the tow bar and extending rearwardly beyond the swinging axis of the tow bar.

2. In a caster such as described, the combination of a horn, a caster wheel mounted in the horn, a top plate to which the horn is associated for swiveling movement of the latter, a support projecting forwardly from the upper part of the horn, a brake member pivotally mounted in said support for movement toward and away from the periphery of the caster wheel, and a swinging tow bar mounted in said support forwardly of said brake member and which by swinging movement applies and releases the brake member for braking and releasing the wheel, said tow bar having a brake-applying position adjacent said top plate in which it cooperates with said top plate to inhibit swiveling movement of the horn, said tow bar actuating said brake member by an extension of the tow bar past its swinging axis, which extension serves as an actuating cam for the brake member.

3. In a caster such as described, the combination of a top plate, a horn beneath the top plate in swiveling relation thereto, a caster wheel mounted in the horn, a support comprising substantially horizontal members projecting from the upper part of the horn, an elongated brake member extending transversely of the wheel and having suspending arms at the ends thereof for mounting said brake member on said support for swinging movement toward and away from the periphery of the wheel, each of said arms having the upper end thereof pivoted to one of said support members intermediate the ends of the support member, a lever pivotally mounted in said support for swinging movement in an upright plane having a pivotal axis forwardly of the pivots of said brake member, and a cam for applying said brake member to the wheel to brake the wheel and for releasing the brake member, said cam being in rigid relationship to said lever and engageable with said brake member intermediate of the ends of the brake member.

4. In a caster such as described, the combination of a top plate, a horn in swiveling relationship to the top plate, caster wheels mounted side by side upon an axle supported at the lower end of the horn, a support projecting forwardly from the upper part of the horn, an elongated swingable brake member extending transversely of said wheels and having suspending arms pivoted at their upper ends in said support, a cross member extending between the sides of said support forwardly of the pivots of said brake member, said brake member having adjacent the lower part thereof braking portions to make contact with and release portions of the treads of said wheels at the upper parts of said wheels, a hollow shaft swingably mounted on said cross member, a tow bar rigidly fixed to said hollow shaft swingable from a substantially horizontal position to an upright position, and cam members rigid with said hollow shaft adapted to engage portions of said brake member intermediate of the ends of the brake member for applying the brake member to the wheels when the tow bar is in the raised position and releasing the brake member from the wheels when and as the tow bar is lowered.

5. In a caster such as described, the combination of a top plate, a horn beneath and in swiveling relation to the top plate, caster wheels rotatable in the lower end of the horn, a support projecting from the upper part of the horn in a generally horizontal direction, a braking device engageable with the upper parts of the caster wheels and having an upper pivot on said support intermediate of the ends of said support, said braking device comprising a spring-pressed movable part engageable with the wheel treads and having at the upper part thereof a plate part provided with a cross groove progressively decreasing in depth in one direction, and a member for pressing said braking device in the direction of the wheel treads to apply the brake, said last-named member being pivoted to said support to swing in a vertical plane and having rigid therewith a camming part which in engaging the braking device makes contact with the bottom of said cross groove provided in the plate part.

6. In a caster such as described, the combination of a horn having a caster wheel mounted therein, a support projecting forwardly from the upper part of the horn and having substantially parallel side members, a cross member interconnecting said side members adjacent their forward ends, a brake member having suspending arms for mounting said brake member on said support for swinging movement toward and away from the periphery of said wheel, said arms having their upper ends pivoted to said side members rearwardly of said cross member, said brake member having a braking portion adjacent the lower part of the brake member and engageable with the periphery of the wheel to brake the wheel, a hollow shaft swingably mounted on said cross member, a tow bar fixed to said shaft intermediate the ends of the latter and swingable from a horizontal position to an upright position, and a cam member rigid with said hollow shaft and engageable with the lower part of said brake member for applying the brake member to the wheel when and as the tow bar is moved to the raised position thereof and releasing the brake member from the wheel when and as the tow bar is moved to the lowered position thereof.

7. In a caster such as described, the combination of a top plate having a recess provided in the forward edge thereof, a horn beneath and supported from the top plate in swiveling relation with respect thereto, a caster wheel mounted in the horn, a support projecting forwardly from the upper part of the horn and having substantially parallel side members, a cross member interconnecting said side members adjacent their forward ends, a brake member having suspending arms for mounting said brake member on said support for swinging movement toward and away from the periphery of said wheel, said arms having their upper ends pivoted to said side members rearwardly of said cross member, said brake member having a braking portion adjacent the lower part thereof and engageable with the periphery of the wheel to brake the wheel, a hollow shaft swingably mounted on said cross member, a tow bar fixed to said shaft intermediate the ends of the latter and swingable from a substantially horizontal position to an upright position, and a cam member rigid with said hollow shaft and engageable with the lower part of said brake member for applying the brake member to the wheel when and as the tow bar is moved to the raised position thereof and releasing the brake member from the wheel when and as the tow bar is moved to the lowered position thereof, and said tow bar extending into said recess in the top plate when the tow bar is in raised position thereby inhibiting swiveling movement of the horn when the brake member is applied to the wheel to brake the latter.

8. In a caster such as described, the combination of a horn having a caster wheel mounted therein, a support projecting forwardly from the upper part of the horn and having substantially parallel side members, a cross member interconnecting said side members adjacent their forward ends, a brake member including a pressure plate provided with an upwardly facing cross groove progressively decreasing in depth and also provided with suspending arms for mounting the plate on said support for swinging movement toward and away from the periphery of said wheel, said arms having their upper ends pivoted to said side members rearwardly of said cross member, said brake member comprising a brake shoe beneath the pressure plate and provided with spring means connecting the shoe to the pressure plate and urging the latter and the shoe apart, said shoe being engageable with the periphery of the wheel to brake the wheel, a hollow shaft swingably mounted on said cross member, a tow bar fixed to said shaft intermediate the ends of the latter and swingable from a substantially horizontal position to an upright position, and a cam member rigid with said hollow shaft for pressing the brake member toward the periphery of the wheel when and as the tow bar is moved to the raised position thereof and releasing the brake member from the wheel when and as the tow bar is moved to the lowered position thereof, said cam member engaging the bottom of said groove provided by the pressure plate.

References Cited in the file of this patent

UNITED STATES PATENTS

| Number | Name | Date |
|---|---|---|
| 1,766,104 | Coates | June 24, 1930 |
| 2,336,642 | Schreck | Dec. 14, 1943 |
| 2,375,363 | Hokanson | May 8, 1945 |
| 2,421,464 | Reiner | June 3, 1947 |
| 2,453,575 | House | Nov. 9, 1948 |